United States Patent [19]

Sugahara et al.

[11] 3,956,005

[45] May 11, 1976

[54] COATED PIGMENT COMPOSITION HAVING IMPROVED ABRASION RESISTANCE AND PROCESS FOR PREPARATION THEREOF

[75] Inventors: Yujiro Sugahara, Tokyo; Kaichiro Miyazawa, Tsuruoka; Okitsu Hidetika, Tsuruoka; Mamoru Saito, Tsuruoka, all of Japan

[73] Assignee: Mizusawa Kagaku Kogyo Kabushiki Kaisha, Osaka, Japan

[22] Filed: May 22, 1974

[21] Appl. No.: 472,196

[30] Foreign Application Priority Data
May 23, 1973 Japan..........................48-56742

[52] U.S. Cl. ............................ 106/298; 106/308 B; 428/404
[51] Int. Cl.² ......................................... C09C 1/20
[58] Field of Search ...................... 106/298, 308 B; 117/100 S; 428/404

[56] References Cited
UNITED STATES PATENTS

| | | | |
|---|---|---|---|
| 3,639,133 | 2/1972 | Linton | 106/298 |
| 3,773,535 | 11/1973 | Burgyan et al. | 106/298 |
| 3,798,045 | 3/1974 | Jackson | 106/298 |

*Primary Examiner*—Winston A. Douglas
*Assistant Examiner*—J. V. Howard
*Attorney, Agent, or Firm*—Sherman & Shalloway

[57] ABSTRACT

A coated pigment composition having improved resistance, especially to abrasion, is disclosed, said coated pigment composition consisting essentially of particles composed mainly of an inorganic color pigment and a continuous solid glass coating layer covering the surfaces of said pigment particles, said continuous solid glass coating layer being formed of a continuous phase composed mainly of an alkali polysilicate having the following mole composition $$MO_2 : SiO_2 = \text{from } 1:3 \text{ to } 1:2$$

wherein $M$ stands for an alkali metal component, in which the solid glass coating layer is present in an amount, as calculated as $SiO_2$, of from 3 to 40 % by weight based on said pigment particles and the value of the specific surface area ratio, expressed by the following formula $$R_s = S_c/S_u$$

wherein $S_u$ stands for the specific surface area (m²/g) of uncoated pigment particles, $S_c$ stands for the specific surface area (m²/g) of coated pigment particles, and $R_s$ stands for the specific surface area ratio, is within a range of from 1.00 to 1.07.

15 Claims, No Drawings

COATED PIGMENT COMPOSITION HAVING IMPROVED ABRASION RESISTANCE AND PROCESS FOR PREPARATION THEREOF

This invention relates to coated pigment compositions having improved resistance, especially to abrasion, and to a process for the preparation of such coated pigment compositions. More specifically, the invention relates to coated pigment compositions which have highly improved abrasion resistance as well as improved chemical resistance and weatherability, said coated pigment composition comprising particles of a color pigment such as lead chromate pigments, ultramarine pigments and prussian blue pigments, and deposited on their surfaces, a continuous phase coating of a solid glass.

Lead chromate has been known as a yellow pigment (chrome yellow). Lead chromate is poor in chemical resistance. For instance, it is whitened upon contact with sulfuric acid and is reddened by an action of an alkali. It has also a deficiency that it is colored green to black by hydrogen sulfide. Many attempts have been made to improve the chemical resistance of lead chromate by depositing a coating excellent in chemical resistance on the surfaces of lead chromate particles.

For instance, in the specification of U.S. Pat. No. 2,296,638 Hanahan proposes a process comprising adding a solution of sodium silicate to a dispersion of a color pigment such as lead chromate and acidifying the dispersion to deposit gelled silica on the surfaces of particles of the pigment. This invention is epochmaking in that it disclosed for the first time the concept of coating the surfaces of pigment particles with silica excellent in chemical resistance. However, the process of Hanahan is still insufficient with respect to the resistance of coated pigment particles because gel-like silica is merely deposited on the surfaces of pigments.

As regards silica-coated lead chromate pigments, Linton has recently proposed a series of inventions. For instance, the specification of U.S. Pat. No. 3,370,971 proposes a lead chromate pigment composition consisting essentially of a lead chromate pigment and deposited on the surface of pigment particles, as a substantially continuous coating, at least 2% by weight of dense, amorphous silica. In the preparation of this lead chromate pigment composition, a socalled active silica is prepared by (a) adding simultaneously or separately a soluble silicic acid salt and a mineral acid to a pigment slurry, or (b) deionizing a solution of sodium silicate with a cation exchange resin and adding the as-prepared silicic acid solution to a pigment slurry, or (c) adding a solution of sodium silicate to a pigment slurry and then adding sulfuric acid to the slurry, and the so prepared active silica is gradually deposited in the dense state on the surfaces of the lead chromate pigment particles at a pH above 6.0, preferably from 9.0 to 9.5. The so formed amorphous silica coating layer has such a structure that fine particles of silica are densely accumulated, and although this pigment composition is excellent in resistance to such chemicals as acids and alkalis and in reduction resistance upon contact with molten resins, in view of the structure of the coating layer, the pigment composition is apparently poor in abrasion resistance. For instance, as regards this defect, the specification of said U.S. Patent states as follows:

"For instance, if the new products are mixed with a hard, granular material, such as a crystalline salt or even a granular plastic such as polystyrene, and subjected to vigorous stirring as by tumbling or rolling in a closed container, the coatings appear to be essentially destroyed and the products have the general properties of an untreated pigment. Obviously, such handling should be avoided." (See column 7, lines 34 to 43 of the specification of U.S. Pat. No. 3,370,971.)

As improvements of abrasion resistance in such amorphous silica-coated lead chromate pigment particles, Linton proposed further deposition of an alkaline earth metal salt of rosin acid or a long-chain fatty acid (see the specification of U.S. Pat. No. 3,470,007) and the pre-treatment of lead chromate pigment particles in the slurry conducted, prior to deposition of amorphous silica, to adjust the size of the lead chromate pigment particles within a specific range by imposing a very high shearing force on the pigment particles (see the specification of Japanese Patent Publication No. 46-34788).

However, none of these improvements change essentially the structure of the coating layer composed of amorphous silica but moderate the substantial defect of this coating layer, i.e., poor abrasion resistance, to some extent by further deposition of a metal soap or by excluding agglomeration of the pigment particles. Obviously, the improvement of the abrasion resistance by such proposals is greatly limited.

During our research to form a strong and compact coating excellent in chemical resistance on an inorganic color pigment such as a lead chromate pigment, we arrived at the following finding.

A silica coating deposited from so-called "active" silicic acid used in the above-mentioned invention of Linton exhibits a hard granular appearance in the dried state, but when it is pressed between fingers, it is converted to a very fine powder having a feeling or touch similar to that of white carbon. However densely and uniformly such fine particles of silica are deposited on the surfaces of pigment particles, it is quite natural that the resulting coating in which there is no mutual bonding among fine particles of silica should be brittle and fragile.

As a result of considerations made on the above phenomenon, we presumed that in case a coating of a siliceforous substance is formed on the surfaces of pigment particles, coated pigment particles having better abrasion resistance would be obtained by forming on the pigment surface particles a continuous phase coating of a glassy substance containing not only a siliceferous component but also an alkali component, rather than by depositing fine particles of silica on the surfaces of pigment particles. Along the line of this presumption, we made a series of experiments in which a variety of aqueous solutions of sodium polysilicate differing in the pH were prepared and they were subjected to evaporation drying, and it was examined whether the resulting solid substances were vitreous or not. As a result, it was confirmed that each of the resulting granular products obtained at a pH of at least 11 was vitreous and had a very high resistance to abrasion.

Based on the foregoing finding, we succeeded in obtaining coated pigment compositions which are highly improved in such characteristics as chemical resistance, weatherability, thermal stability and abrasion resistance, by wetting an inorganic color pigment such as a lead chromate pigment with an aqueous solution of sodium polysilicate, drying the mixture to the solid by evaporation and thus forming a continuous phase coating of a vitreous substance having physical properties quite different from those of conventional amorphous silica coatings.

In accordance with this invention, there is provided a coated pigment composition having improved resistance, especially to abrasion, which consists essentially of particles composed mainly of an inorganic color pigment and a continuous solid glass coating layer covering the surfaces of said pigment particles, said continuous solid glass coating layer being formed of a continuous phase composed mainly of an alkali polysilicate having the following mole composition $$M_2O : SiO_2 = \text{from } 1:5 \text{ to } 1:2$$

wherein $M$ stands for an alkali metal component, in which the solid glass coating layer is present in an amount, as calculated as $SiO_2$, of from 3 to 40 % by weight based on said pigment particles and the value of the specific surface area ratio, expressed by the following formula $$R_s = S_c/S_p$$

wherein $S_p$ stands for the specific surface area (m²/g) of uncoated pigment particles, $S_c$ stands for the specific surface area (m²/g) of coated pigment particles, and $R_s$ stands for the specific surface area ratio,
is within a range of from 1.00 to 1.07.

In accordance with this invention, there is also provided a process for the preparation of coated pigment compositions having improved resistance, especially to abrasion, which comprises wetting particles composed mainly of an inorganic color pigment with an aqueous solution of an alkali polysilicate having the following composition $$M_2O \cdot nSiO_2$$

wherein $M$ stands for an alkali metal and $n$ is a number of from 2 to 5,
drying the mixture to the solid by evaporation to form on said pigment particles a continuous phase of a solid glass composed mainly of an alkali polysilicate having the following mole composition $$M_2O : SiO_2 = \text{from } 1:5 \text{ to } 1:2$$

repeating the above wetting and evaporation drying treatments several times according to need, and thus forming coated pigment particles in which the solid glass coating layer is present in an amount, as calculated as $SiO_2$, of 3 to 40 % by weight based on said pigment particles and the value of the specific surface area ratio, expressed by the following formula $$R_s = S_c/S_p$$

wherein $S_p$ stands for the specific surface area (m²/g) of uncoated pigment articles, $S_c$ stands for the specific surface area (m²/g) of coated pigment particles, and $R_s$ stands for the specific surface area ratio,
is within a range of from 1.00 to 1.07.

This invention will now be illustrated in more detail.

Various known inorganic color pigments can be used in this invention. It is especially preferred that this invention is applied to pigments composed mainly of lead chromate. Pigments composed mainly of lead chromate, i.e., lead chromate pigments, which can be used in this invention include pigments composed solely of lead chromate and mixed crystals of lead chromate and other lead salt, such as mixed crystals of lead chromate and lead sulfate, mixed crystals of lead chromate and lead molybdate, etc. Lead chromate pigments usable in this invention are described in "Color Index" and the following are well known in the art:
Chrome Yellow, CI-77600
Basic Lead, Chromate CI-77601
Lead Sulfochromate, CI-77603
Molybdate Orange, CI-77605

Inorganic color pigments other than lead chromate pigments are, in general, poor in chemical resistance. For instance, ultramarine pigments are stable against alkalis but are poor in resistance to acids, and prussian blue pigments are relatively resistant to acids but are instable against alkalis. Physical properties such as chemical resistance of these inorganic color pigments as well as lead chromate pigments can be improved according to this invention. As such inorganic color pigments, the following may be mentioned:
Trilead Tetroxide, CI-77499
Cadmium Yellow, CI-77199
Cadmium Red, CI-77202
Cadmium Mercury Red
Cobalt Violet, CI-77360 and CI-77350
Ultramarine, CI-77007
Prussian Blue, CI-77510 and CI-77520
Chrome Green In general, these pigments have a particle size of 0.1 to 20 microns. In this invention, it is preferred to employ pigments having a relatively small particle size, such as ranging from 0.1 to 2 microns. It is also possible to employ pigments having a relatively large particle size and pulverize them prior to the treatment with an aqueous solution of an alkali polysilicate.

These pigments may be subjected to the treatment of this invention in the form of a wet cake or paste obtained at the steps of the manufacture of pigments, or they may be used in the form of a dry powder.

In accordance with this invention, particles of a pigment such as mentioned above are wetted with an aqueous solution of an alkali polysilicate by dispersing the particles in said aqueous solution. An aqueous solution of an alkali polysilicate having the following mole composition $$M_2O \cdot nSiO_2$$

wherein $M$ stands for an alkali metal such as sodium and potassium, and $n$ is a number of 2 to 5,
is used in this invention. This alkali polysilicate is ordinarily available as water glass having the following mole composition $$M_2O \cdot nSiO_2$$

wherein $M$ stands for an alkali metal such as sodium and potassium, and $n$ is a number of 2 to 5, preferably 2.1 to 3.5, namely a solution of an alkali polysilicate having generally a pH of 11 to 13. When this water glass solution has a pH much higher than 11, its pH can be adjusted to one approximating 11 by adding a mineral acid to the solution. In general, water glass is marketed in the form of a concentrated aqueous solution of alkali-silicate glass in which the alkali component is $Na_2O$. In this invention, it is possible to employ water glass solutions in which the alkali component is $K_2O$ or a mixture of $Na_2O$ and $K_2O$ in addition to the above-mentioned commercially available solution.

At this wetting step, mixing is conducted under agitation so that pigment particles are wetted uniformly and sufficiently with an aqueous solution of an alkali polysilicate More specifically, mixing is generally conducted for 10 to 60 minutes under agitation by means of an ordinary agitation mixer, a ball mill, a shaking mill, a homogenizer, an ultrasonic vibrator or the like. The temperature at which mixing under agitation is conducted is not particularly critical, and this operation can be performed even at room temperature. However, in order to expedite the subsequent drying step, it is preferred to mix pigment particles with the alkali polysilicate solution under agitation at a relatively high temperature, for example, 50° to 95°C.

The amount of the alkali polysilicate to be compounded in the pigment by one operation varies to some extent depending on the concentration of the aqueous solution used, but in general, it is preferred that the amount of the alkali polysilicate calculated as $SiO_2$ is 3 to 40 % by weight, especially 10 to 30 % by weight, based on the pigment. If the amount used of the alkali polysilicate is smaller than the above range, the operation of dispersing and evaporation drying should be repeated many times in order to obtain a desired vitreous coating layer and repetition of the operation is troublesome. In case the amount used of the alkali polysilicate exceeds the above range, the coating composition obtained at the step of evaporation takes, in many cases, a dumpling-like form in which the pigment particles are excessively agglomerated, and such form is not preferred for attaining the objects of this invention.

The concentration of the alkali polysilicate aqueous solution used varies greatly depending on the pH of the alkali polysilicate, but in general, it is desired that the concentration is chosen within a range of from 0.5 to 10% calculated as $SiO_2$ so that the alkali polysilicate can be present in the stable state.

The alkali polysilicate aqueous solution is used in an amount sufficient to wet the entire surfaces of the pigment particles with the aqueous solution. More specifically, the aqueous solution of the alkali silicate is used in an amount of at least 40 ml per 100 g of the pigment.

At this wetting step of this invention, the pigment is slurryed in an aqueous solution of an alkali polysilicate and the pigment particles are wetted with the alkali polysilicate aqueous solution. Then, the whole resulting slurry mixture is subjected to the next step of evaporation to dryness. It is also possible to separate the pigment particles including the alkali polysilicate aqueous solution from the resulting slurry mixture by known solid-liquid separation means such as centrifugal separation and decantation, and then subject the separated pigment particles to the next step of evaporation to dryness.

One of the important features of this invention is that a composition composed of pigment particles wetted with an aqueous solution of an alkali polysilicate is subjected to evaporation to dryness to form on the pigment particles a continuous phase of a solid glass composed mainly of the alkali polysilicate.

According to this invention, contrary to the conventional concept that fine particles of amorphous silica is densely deposited on pigment particles, a continuous phase coating composed of an aqueous solution of an alkali polysilicate is first formed on pigment particles and the coated pigment particles are subjected to evaporation to dryness to leave the alkali polysilicate in the form of a continuous phase of glass on the pigment particles, whereby a transparent protective coating layer excellent in not only such properties as chemical resistance and weatherability but also abrasion resistance can be formed uniformly on the pigment particles.

In this invention, no particular conditions need not be set as regards the pH adjustment and the like when pigment particles wetted with an aqueous solution of an alkali polysilicate is subjected to evaporation to dryness. Further, a continuous phase coating of a vitreous substance having the above-mentioned excellent properties can be formed only if the pH of an aqueous solution of an alkali polysilicate is adjusted to at least 11. The criticality of the pH value of the alkali polysilicate solution used will be apparent from results of the following experiment.

Commercially available sodium silicate No. 3 was diluted with water to form an aqueous solution having a concentration of 0.25 mole/l, and the solution was passed through a column packed with a cation exchange resin of the hydrogen ion type to remove the soda component. As a result, there was obtained an aqueous solution of an alkali polysilicate having a pH ranging from about 9 to about 11. The solution was placed on an evaporating dish and dried at 110°C. for 72 hours in a drier. Results of the analysis of the dried product and the form of the dried product are shown in Table 1.

Table 1

| pH Value | $SiO_2$(%) | $Na_2O$(%) | $Na_2O/SiO_2$ Mole Ratio | Form | Specific Surface Area (m²/g) |
|---|---|---|---|---|---|
| 8.97 | 87.4 | 2.6 | 1/34.1 | powdery aggregate | 83 |
| 9.98 | 86.9 | 4.5 | 1/19.9 | powdery aggregate | 26 |
| 11.03 | 67.2 | 18.8 | 1/3.7 | glass | 1.7 |

The results shown in Table 1 indicate that when the alkali polysilicate aqueous solution used for wetting of pigment particles has an alkali metal content within the range specified in this invention, namely the pH of the solution is at least 11, it is possible to form a tough and dense coating of a vitreous substance.

In this invention the step of evaporation to dryness is conducted with such attention that the alkali polysilicate contained in the aqueous solution is left on the pigment particles in the form of a continuous phase coating of glass. Therefore, drying at too high a temperature or abrupt evaporation of water should be avoided. It is generally preferred that water is gradually evaporated by conducting drying at a temperature of 60° to 150°C., especially 80° to 105°C. Evaporation of wetted pigment particles to dryness can be performed according to various drying methods and a suitable method is chosen depending on the form and state of the wetted pigment. For example, in the case of the wet pigment having a low content of included liquid, the pigment can be dried by employing a drying furnace of the moving or fluidized bed type or according to the spray drying method. In the case of the pigment having a high content of included liquid, evaporation to dryness can be accomplished by using an evaporating dish. In this case, it is possible to adopt a method comprising removing water from the wetted pigment by drying it on an evaporating dish until the content of included liquid is lowered to some extent, and then taking the semi-dried product from the evaporating dish and further drying it by the above-mentioned drying means.

In this invention, by the above drying treatment, a continuous phase coating of a vitreous substance is formed on surfaces of the pigment particles. In some cases, the glass-coated pigment particles are obtained in more or less agglomerated state. Such agglomerated pigment composition, however, can readily be converted to a coated pigment composition having a finer particle size by pulverizing the dried agglomerated pigment according to the dry or wet pulverization method. In case it is not desired that the alkali metal component is present on the surface of the coating layer, the resulting coated pigment composition is washed with water and, if desired, the alkali metal present on the surface layer can be ion-exchanged with an alkaline earth metal, zinc, aluminum, zirconium, titanium, tin, antimony or the like by treating it with a water-soluble salt of such metal.

According to this invention, a tough continuous coating composed mainly of an alkali polysilicate can be formed on pigment particles by suspending pigment particles in an aqueous solution of an alkali polysilicate and evaporating the aqueous solution to dryness on the pigment particles. In order to further improve properties of the vitreous coating film, it is preferred to repeat the above wetting treatment and evaporation treatment several times, for example, two times or three times. In case the wetting and evaporation treatments are repeated several times, the same conditions as described above can be similarly adopted at each time. It is also possible to conduct the wet or dry pulverization treatment or water washing treatment at an optional stage during the cycle of the above treatments.

Unlike conventional amorphous silica-deposited coatings, the coating layer of this invention formed on the pigment particles has a continuous phase composed mainly of an alkali polysilicate and has characteristics inherent of solid glass.

Amorphous silica used for coating pigment particles in the conventional techniques has a relatively large BET specific surface area exceeding 50 $m^2/g$ though it varies to some extent depending on the gel structure or particle size.

In contrast, the alkali polysilicate glass used as the coating in this invention has generally a very small specific surface area not exceeding several square meters per gram and it is very close to zero. Obviously, this fact indicates that the coating layer of the coated pigment composition of this invention has characteristics of so-called integrated glass, which can be clearly distinguished from characteristics of a dense aggregate of gel-like silica or fine powdery silica. By virtue of the presence of this glass coating layer, the coated pigment composition of this invention can exhibit an extremely high resistance to abrasion, and even when it is mixed with other inorganic pigment, a filler, a stabilizer or a granular plastic material and the mixture is violently blended or pulverized, the coating shows no tendency of peeling or breaking. Further, this glass coating has a very high impermeability to acids, alkalis, soap solutions and gases such as hydrogen sulfide, and hence, it imparts excellent abrasion resistance, chemical resistance and weatherability to the pigment particles.

The coated pigment composition of this invention, which has the above-mentioned specific vitreous coating layer, is characterized in that the specific surface area ratio represented by the following formula $$R_s = S_c \cdot S_p$$

wherein $S_p$ is the specific surface area ($m^2/g$) of the uncoated pigment particles, $S_c$ is the specific surface area ($m^2/g$) of the coated pigment particles, and $R_s$ indicates the specific surface area ratio, is within a range of from 1.00 to 1.07. In known amorphous silica-coated pigments, the value of the above-mentioned specific surface area ratio is 1.09 at lowest. In contrast, the coated pigment composition of this invention has a much lower value of the specific surface area ratio, and it will readily be understood that the coated pigment composition is much superior to known amorphous silica-coated pigments with respect to the continuity and density of coating.

The vitreous coating layer of the coated pigment composition of this invention has a glass transition temperature and in this point it can clearly be distinguished from the amorphous silica coating layer in conventional coated pigments. Known anhydrous water glass has generally a glass transition temperature of about 400°C. In the coated pigment composition of this invention, the vitreous coating layer has, in general, a glass transition temperature of 400° to 500°C., though it varies to some extent within this range depending on the composition of the alkali polysilicate constituting the coating layer. In case the pigment particles per se are stable at temperatures within the above range, the glass trannsition temperature of the coating can be determined by subjectting the coated pigment particles directly to the differential thermal analysis.

It is preferred that the vitreous coating layer composed mainly of the alkali polysilicate is present in the coated pigment composition in an amount, calculated as $SiO_2$, of 3 to 40% by weight, especially 10 to 30% by weight, based on the pigment particles. In case the amount of the glass layer is smaller than 3% by weight, no substantial improvements of various resistance can be obtained. When the amount of the glass layer is larger than 40% by weight, no particular effect is attainable but such an undesired phenomenon as dilution of the pigment is brought about.

Another prominent advantage of this invention is that a vitreous coating having a desirable combination of acid resistance and alkali resistance can be formed only by adjusting the pH of an aqueous solution of an alkali polysilicate to be used for wetting pigment particles, namely the alkali metal content in the alkali polysilicate, within the range specified in this invention. This feature can easily be understood from results of the following experiment.

Sodium polysilicate solutions differing in the pH value, which are shown in Table 1, were used for wetting particles of chrome yellow, and the wetted particles were subjected to evaporation to dryness. With respect to each of the resulting coated pigment compositions, the specific surface area ratio ($R_s$), the acid resistance ($4N-H_2SO_4$) and the alkali resistance ($0.5N-NaOH$) were determined. Results are shown in Table 2. The acid or alkali resistance was evaluated based on the degree of discoloration rated as follows:
5 : no discoloration or discoloration was hardly observed 4 : very slight discoloration was observed
3 : slight discoloration was observed
2 : considerable discoloration was observed
1 : so extremely discolored that the pigment could not put into practical use Table 2

| pH Value | Specific Surface Area Ratio (Rs) | Acid Resistance (4N-$H_2SO_4$) | Alkali Resistance (0.5N-NaOH) |
| --- | --- | --- | --- |
| 8.97 | 15.3 | 1 | 2 |
| 9.98 | 13.0 | 1 | 2 |
| 11.03 | 1.02 | 5 | 4 |
| uncoated chrome yellow | — | 1 | 1 |
| density silica deposited chrome yellow | 3.5 | 4 | 3 |

According to this invention, by forming a vitreous coating of a continuous phase composed of an alkali polysilicate on surfaces of particles of a color pigment, it is made possible to improve such properties of the color pigment as acid resistance, alkali resistance, washing resistance, resistance to chemicals such as hydrogen sulfide, weatherability and reduction resistance, and this protective coating per se has improved abrasion resistance, peel resistance and toughness. In addition to these improved physical and chemical properties, the coated pigment composition of this invention has characteristics desired in connection with prevention of pollutions. This point will now be described in brief.

In the case of conventional pigments of the lead type, the chrome type or the cadmium type, at the coating step or at the time of peeling or discarding coatings or colored resin molded articles, the metal components contained in these paints are released and scattered in environments, and when these metal components are dissolved out, they drastically contaminate environments. In contrast, in the case of the coated pigment composition of this invention, since pigment particles are completely covered with a vitreous coating, the tendency of harmful metal components to be dissolved out in environments can be completely inhibited because of the presence of such coating, and this effect of preventing dissolution can be maintained even when the coated pigment composition of this invention is subjected to the incineration treatment.

For the above-mentioned various advantages, the coated pigment composition of this invention can be conveniently used in various fields. For instance, the composition of this invention is very useful for formation of printing inks and paints and for coloring various molded resin products and rubber products.

This invention will now be described more detailedly by reference to the following Examples. In these Examples, pigments prepared by the following methods were used as bases unless otherwise indicated.

Base 1 (chrome yellow G) (lead chromate)

3.4l of water was added to 6.6l of an aqueous solution of $Pb(NO_3)_2$ having a concentration of 0.76 mole/l to form 10 l of a solution (I) of $Pb(NO_3)_2$ having a concentration of 0.5 mole/l and a pH of 3.60 as measured at 17°C. Separately, 3.2l of an aqueous solution of NaOH having a concentration of 1.48 mole/l was added to 6.8 l of an aqueous solution of $Na_2Cr_2O_7$ having a concentration of 0.37 mole/l to form 10 l of a solution (II) of $Na_2CrO_4$ having a concentration of 0.5 mole/l and a pH of 12.04 as measured at 17°C. The solution (II) was added to the solution (I) under violent agitation within a period of 30 minutes, and after completion of the addition, the mixture was further agitated for 30 minutes to form a liquid reaction product mixture having a pH of 5.04 as measured at 18°C. The liquid reaction product mixture was filtered, and the recovered solid was washed, dried and pulverized to obtain a base G.

Base 2 (chrome yellow 5G) (lead chromate-lead sulfate)

3.3l of water was added to 6.7l of an aqueous solution of $Pb(NO_3)_2$ having a concentration of 0.74 mole/l to form 10l of a solution (III) of $Pb(NO_3)_2$ having a concentration of 0.5 mole/l having a pH of 3.53 as measured at 18°C. Separately, 5.9l of an aqueous solution of $Na_2Cr_2O_7$ having a concentration of 0.34 mole/l, 0.71 of an aqueous solution of NaOH having a concentration of 5.8 mole/l, 0.4l of an aqueous solution of $Na_2SO_4$ having a concentration of 2.5 mole/l and 3.0l of water were mixed and agitated sufficiently to form 10l of a solution (IV) containing 0.4 mole/l of $Na_2CrO_4$ and 0.1 mole/l of $Na_2SO_4$ and having a pH of 11.80 as measured at 24°C. The solution (IV) was added to the solution (III) under violent agitation within a period of 30 minutes. After completion of the addition, the mixture was further agitated for 30 minutes to obtain a liquid reaction product mixture having a pH of 6.10 as measured at 20°C., which was then treated in the same manner as in the case of base 1.

Base 3 (molybdenum red) (lead chromate-lead molybdate-lead sulfate)

2l of an aqueous solution of $Pb(NO_3)_2$ having a concentration of 0.105 mole/l was taken into a 5 l-capacity beaker. In another vessel, 0.077 mole of $Na_2Cr_2O_7$ dihydride, 0.024 mole of $Na_2SO_4$, 0.022 mole of $Na_2MoO_4$ dihydride and 0.16 mole of NaOH were dissolved in water to form 2l of an aqueous solution. The so formed solution was added to the above solution of $Pb(NO_3)_2$ at a rate of 2l/140 min at room temperature. The mixture was agitated for a while to obtain a liquid reaction product mixture having a pH of 4.50 as measured at 24°C. The pH was adjusted to 2.5 to 3.0 by addition of a dilute aqueous solution of nitric acid. The mixture was agitated for 30 minutes and filtered, and the recovered solid was washed, dried and pulverized to particles having a size passable through 200-mesh silk sieve.

Base 4 (basic lead chromate)

0.5l of an aqueous solution (I) of $Pb(NO_3)_2$ having a concentration of 0.5 mole/l and a pH of 3.30 as measured at 22°C. was prepared. Separately, 0.25l of an aqueous solution of $Na_2CrO_4$ having a concentration of 0.5 mole/l was combined with 0.5l of an aqueous solution of NaOH having a concentration of 0.5 mole/l to form a solution (V) having a pH of 13.40 as measured at 20°C. Both the solutions (I) and (V) were added under agitation within a period of 50 minutes into a vessel charged with 0.5l of water. After completion of the addition, the mixture was agitated for 30 minutes to obtain a liquid reaction product mixture having a pH of 5.63 as measured at 23°C., which was then treated in the same manner as in the case of the base 1.

The hue and resistance of the products obtained in the Examples were determined according to the following methods unless otherwise indicated.

Test Methods

1. Hue and Color Difference:

0.6 ml of a vehicle (1 g of castor oil plus 1 g of DOP) was added to 1 g of a sample, and they were kneaded by a Hoover muller to form a homogeneous mixture. The mixture was transferred onto a glass sheet and was kneaded with 3.7 g of a non-discolorable clear laquer to form a homogeneous non-discolorable lacquer enamel. The enamel was placed on art paper, expanded into a uniform thickness by a film applicator having a slit of 0.127 mm, and naturally dried. With respect to the resulting sheet for the hue test, the spectral intensity was determined on the three points of B=470 m$\mu$, G=530 m$\mu$ and R=610 m$\mu$ by a spectrophotometer according to a simplified modification of the method specified in JIS, and the values of L, a and b were calculated according to the following conversion formulae and the difference $\Delta E$ from the standard color was obtained.

$$X = 0.80R + 0.18B$$

$$Y = G$$

$$Z = 1.18B$$

$$L = 100\sqrt{Y}$$

$$a = 175(1.02X - Y)/\sqrt{Y}$$

$$b = 70(Y - 0.847Z)/\sqrt{Y}$$

$$\Delta L = L_o - L$$

$$\Delta a = a_o - a$$

$$\Delta b = b_o - b$$

$$\Delta E = \sqrt{(\Delta L)^2 + (\Delta a)^2 + (\Delta b)^2}$$

Lo, ao, bo : values of the standard color
L, a, b : values of the tested sheet
standard color : color of the base From the results of this test, it is possible to know to what extent the color of the pigment treated according to this invention differs from the color of the untreated pigment or what difference of the hue is brought about when the treated pigment or untreated pigment is subjected to the chemical treatment or heat treatment.

The above-mentioned rating of the degree of discoloration can be expressed based on the color difference as follows:

| Grade | $\Delta E$ |
|---|---|
| 5 | 0 – 50 |
| 4 | 50 – 150 |
| 3 | 150 – 180 |
| 2 | 180 – 230 |
| 1 | above 230 |

2. Chemical Treatment (Chemical Resistance):

a. $H_2SO_4$ Treatment:

1 g of a sample weighed by a balance was charged in a 100 ml-capacity color comparison tube, and 80 ml of 4N-$H_2SO_4$ measured by a graduated cylinder was added thereto. The mixture was shaken for 1 hour by a shaking machine. The mixture was naturally filtered through Filter Paper No. 3 manufactured by Toyo Roshi K. K. and the recovered solid was washed with water and dried.

b. NaOH Treatment:

1 g of a sample weighed by a balance was charged in a 100 ml-capacity color comparison tube, and 80 ml of 0.5N-NaOH measured by a graduated cylinder was added thereto. The mixture was shaken for 30 minutes. The mixture was treated in the same manner as in (a) above.

c. $H_2S$ Treatment:

1 g of a sample weighed by a balance was charged in a 200 ml-capacity triangular flask, and 100 ml of a saturated aqueous solution of $H_2S$ measured by a graduated cylinder was added thereto. The mixture was shaken now and then in a period of 10 minutes.

Each of the chemical-treated samples was coated on art paper in the same manner as in the test for determination of hue, and the color of the sample was compared with the standard color to determine the color difference $\Delta E$.

3. Light Resistance:

A sheet for the hue test mentioned in (1) above was exposed for 24 hours to a high pressure mercury lamp for the discoloration test disposed 36 cm apart from the sheet, while the sheet was being rotated at 2 rpm. The color of the sample sheet was compared with the standard color to determine the color difference $\Delta E$.

4. Abrasion Resistance:

A 280 ml-capacity, broad-mouth polyethylene bottle was charged with 12 g of a sample, and 160 m of spherical alumina having a form of a ball of a diameter of 3 mm. The vessel was sealed, and the mixture was shaken for 30 or 120 minutes by a shaking machine. Then, the mixture was passed through a sieve of 200 mesh, and the recovered sample was subjected to the chemical resistance test according to the method mentioned in (2) above.

EXAMPLE 1

200 ml of an aqueous solution of sodium silicate ($SiO_2$ concentration = 379.8 g/l, NaOH concentration = 177.1 g/l, $SiO_2/Na_2O$ mole ratio = 2.85) was mixed with 4.8l of water to form a solution of sodium silicate having a concentration of 0.25 mole/l. Each solution was passed at a rate of 10 ml/min through a column of 1 inch diameter and 1 meter length packed with an ion exchange resin to form 3 kinds of sodium polysilicate solutions having pH values of 8.97, 9.98 and 11.03, respectively. A 3 liter-capacity beaker was charged with 2.2l of the solution and 100 g of raw powder of the chrome yellow 5G was immersed in the solution. The pigment base was dispersed under agitation and the dispersion was evaporated and concentrated on a plate heater, dried sufficiently at 110°C. in a drier and pulverized by an atomizer, to obtain a chrome yellow pigment coated with sodium polysilicate. The color difference $\Delta E$ of the so obtained pigment coated with sodium polysilicate (pH = 11.03) according to this invention was below 50 based on the raw powder of chrome yellow 5G, and therefore, it will readily be understood that the hue was hardly changed in this coated pigment though it had been treated in a highly alkaline medium.

The sodium polysilicate-coated pigment of this invention was subjected to the light resistance test. Also in this case, the color difference ΔE was below 50 and, it was found that the coated pigment was excellent in weatherability.

The above-mentioned three coated pigments, uncoated chrome yellow and a chrome yellow pigment on which silica was densely deposited according to the known method were tested with respect to acid resistance, alkali resistance and the specific surface area, to obtain results shown in Table 2 given hereinabove.

The chrome yellow pigment coated with sodium polysilicate according to this invention had a definite glass transition point at 420°C. but any of other coated chrome yellow pigments did not exhibit a definite glass transition point.

The above-mentioned three coated chrome yellow pigments were subjected to the abrasion test for 30 or 120 minutes to obtain results shown in Table 3 given below.

Table 3

Characteristics of Coated Chrome Yellow Pigment After 30 Minutes' or 120 Minutes' Abrasion Test

| pH | 30 Minutes' Abrasion Test | | 120 Minutes' Abrasion Test | |
|---|---|---|---|---|
| | Acid Resistance ($4N-H_2SO_4$) | Alkali Resistance ($0.5N-NaOH$) | Acid Resistance ($4N-H_2SO_4$) | Alkali Resistance ($0.5N-NaOH$) |
| 8.97 (comparison) | 3 | 2 | 2 | 2 |
| 9.98 (comparison) | 3 | 2 | 2 | 2 |
| 11.03 (this invention) | 5 | 3 | 4 | 3 |
| uncoated chrome yellow 5G (base 2) | 1 | 1 | 1 | 1 |

EXAMPLE 2

2218.9 ml of the sodium polysilicate solution of a pH of 11.03 prepared in Example 1 was charged in a 3 liter-capacity beaker, and 100 g of raw powder of chrome yellow G was added thereto and dispersed sufficiently under agitation. The dispersion was evaporated and concentrated on a plate heater, dried in a drier at 110°C. and pulverized by an atomizer. 1 g of the resulting coated pigment composition was taken into a 100 ml-capacity test tube, and it was shaken with 80 ml of $4N-H_2SO_4$ for 60 minutes by a horizontal shaking machine or shaken with 80 ml of $0.5N-NaOH$ for 30 minutes by a horizontal shaking machine, and water-washed and dried.

Each of the so treated coated pigments was tested to obtain results shown in Table 4 given below.

Table 4

| | Degree of Discoloration After Chemical Treatment | |
|---|---|---|
| Treating Chemical | Pigment Coated with Sodium Polysilicate Solution of pH of 11.03 | Raw Powder of Chrome Yellow |
| $4N-H_2SO_4$ | 5 | 1 |
| $0.5N-NaOH$ | 4 | 1 |

EXAMPLE 3

2218.9 ml of the sodium polysilicate solution of a pH of 11.03 prepared in Example 1 was charged in a 3 liter-capacity beaker, and 100 g of raw powder of basic lead chromate was immersed in the solution and dispersed sufficiently under agitation. The dispersion was evaporated and concentrated on a plate heater, sufficiently dried in a drier at 110°C. and pulverized by an atomizer.

1 g of the resulting coated pigment composition was taken into a 100 ml-capacity test tube, and shaken with 80 ml of $4N-H_2SO_4$ for 60 minutes by a horizontal shaking machine or shaken with 80 ml of $0.5N-NaOH$ for 30 minutes by a horizontal shaking machine, water-washed and dried.

Each of the so treated coated pigments were tested to obtain results shown in Table 5.

Table 5

| | Degree of Discoloration After Chemical Treatment | |
|---|---|---|
| Treating Chemical | Pigment Coated with Sodium Polysilicate Solution of pH of 11.03 | Raw Powder of Basic Lead Chromate |
| $4N-H_2SO_4$ | 4 | 1 |
| $0.5N-NaOH$ | 5 | 1 |

EXAMPLE 4

Removal of Na ions was conducted in a column packed with an ion exchange resin in the same manner as in Example 1, and thus, an aqueous solution of sodium polysilicate having a pH of 11.04 ($SiO_2$ concentration = 0.25 mole/l) was prepared.

1109.45 ml of the above sodium polysilicate solution of a pH of 11.04 was taken in an evaporating dish, and 100 g of raw powder of chrome yellow 5G was added thereto and sufficiently dispersed. The dispersion was subjected to evaporation to dryness in a drier maintained at 110°C. and the resulting solid was pulverized.

1109.45 ml of the above sodium polysilicate solution of a pH of 11.04 was taken in an evaporating dish, and 100 g of the above pulverized product was added dispersed into the solution. The evaporation to dryness was conducted in the same manner as above, followed by pulverization.

The above coating procedures were repeated more than two times.

Results of the chemical resistance test made on the so obtained samples are shown in Table 6.

Table 6

| | Degree of Discoloration After Chemical Treatment | | |
|---|---|---|---|
| Treating Chemical | Pigment Coated Twice with Sodium Polysilicate Solution of pH of 11.04 | Pigment Coated Thrice with Sodium Polysilicate Solution of pH of 11.04 | Raw Powder of Chrome Yellow 5G |
| $4N-H_2SO_4$ | 5 | 5 | 1 |
| $0.5N-NaOH$ | 3 | 4 | 1 |

EXAMPLE 5

100 g of the pigment composition coated with sodium polysilicate of a pH of 11.03, which was prepared in Example 1, was dispersed in 1 l of an aqueous solution of $CaCl_2 \cdot H_2O$ having a concentration of 2.5% and a pH of 6.63 as measured at 21°C., and the dispersion was agitated at room temperature for 30 minutes. The resulting product was filtered and washed until no chlorine ion was detected, and the recovered solid was dried at 110°C. and pulverized. In this Example, the pulverization could be conducted with great ease.

What we claim is:

1. A coated pigment composition having improved resistance, especially to abrasion, which consists essentially of particles composed mainly of an inorganic color pigment and a continuous solid glass coating layer covering the surfaces of said pigment particles, said continuous solid glass coating layer being formed of a continuous phase composed mainly of an alkali polysilicate having the following mole composition $$M_2O : SiO_2 = \text{from } 1 : 5 \text{ to } 1 : 2$$

wherein $M$ stands for an alkali metal component, in which the solid glass coating layer is present in an amount, as calculated as $SiO_2$, of from 3 to 40% by weight based on said pigment particles and the value of the specific surface area ratio, expressed by the following formula $$R_s = S_c/S_p$$

wherein $S_p$ stands for the specific surface area (m²/g) of uncoated pigment particles, $S_c$ stands for the specific surface area (m²/g) of coated pigment particles, and $R_s$ stands for the specific surface area ratio, is within a range of from 1.00 to 1.07.

2. A composition set forth in claim 1 wherein the inorganic color pigment is a pigment composed mainly of lead chromate which has an average particle size of 0.1 to 20 microns.

3. A composition set forth in claim 2 wherein the pigment is chrome yellow.

4. A composition set forth in claim 2 wherein the pigment is chrome red.

5. A composition set forth in claim 2 wherein the pigment is molybdate orange.

6. A composition set forth in claim 1 wherein a glass layer composed essentially of an alkali polysilicate is present in an amount, as calculated as $SiO_2$, of 10 to 30% by weight based on the pigment particles.

7. A composition set forth in claim 1 wherein the glass coating layer has a glass transition point ranging from 400° to 500°C.

8. A process for the preparation of coated pigment compositions having improved resistance, especially to abrasion, which comprises wetting particles composed mainly of an inorganic color pigment with an aqueous solution of an alkali polysilicate having the following composition $$M_2O \cdot nSiO_2$$

wherein $M$ stands for an alkali metal and $n$ is a number of from 2 to 5, drying the mixture to the solid by evaporation to form on said pigment particles a continuous phase of a solid glass composed mainly of an alkali polysilicate having the following mole composition $$M_2O : SiO_2 = \text{from } 1 : 5 \text{ to } 1 : 2$$

thus forming coated pigment particles in which the solid glass coating layer is present in an amount, as calculated as $SiO_2$, of 3 to 40% by weight based on said pigment particles and the value of the specific surface area ratio, expressed by the following formula $$R_s = S_c/S_p$$

wherein $S_p$ stands for the specific surface area (m²/g) of uncoated pigment articles, $S_c$ stands for the specific surface area (m²/g) of coated pigment particles, and $R_s$ stands for the specific surface area ratio, is within a range of from 1.00 to 1.07.

9. A process according to claim 8 wherein the alkali polysilicate aqueous solution has a pH of at least 11 and a concentration of 0.5 to 10% as $SiO_2$.

10. A process according to claim 8 wherein the pigment particles are uniformly agitated in the alkali polysilicate aqueous solution at a temperature of 50° to 95°C. to wet the surfaces of the pigment particles with the alkali polysilicate aqueous solution.

11. A process according to claim 8 wherein the mixture of the alkali polysilicate aqueous solution and the pigment particles wetted therewith is directly subjected to evaporation to dryness.

12. A process according to claim 8 wherein the ec evaporation to dryness is conducted at a temperature of 60° to 150°C.

13. The process of claim 8 wherein the wetting and evaporation drying steps are repeated at least once.

14. The composition of claim 1 wherein $M$ is sodium or potassium or a mixture thereof.

15. The composition of claim 14 wherein $M$ is sodium.

* * * * *